June 8, 1954

D. C. HILL 2,680,451

HIGH-PRESSURE CUTOFF VALVE FOR DUST POT ASSEMBLY

Filed March 30, 1953

INVENTOR,
DON C. HILL
BY Lyon & Lyon
ATTORNEYS

June 8, 1954
D. C. HILL
2,680,451
HIGH-PRESSURE CUTOFF VALVE FOR DUST POT ASSEMBLY
Filed March 30, 1953
2 Sheets-Sheet 2
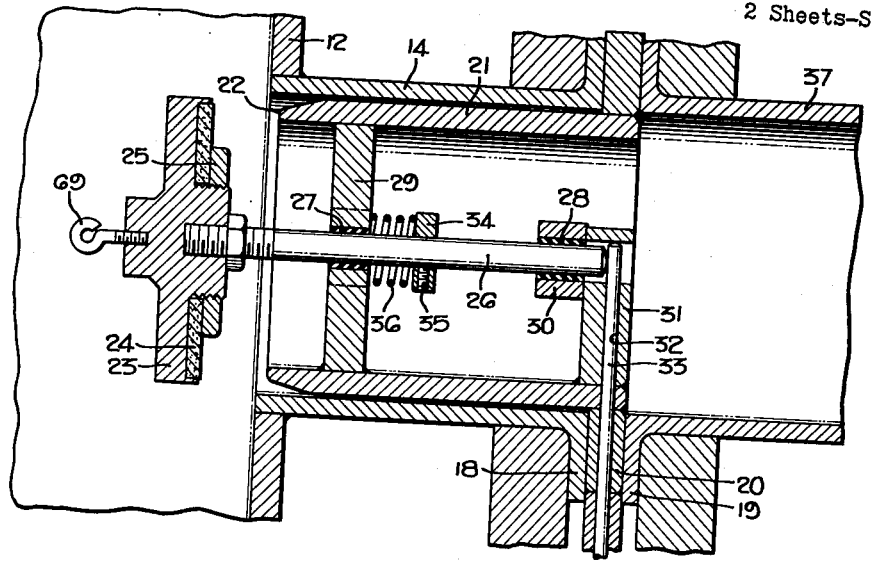
FIG. 2.
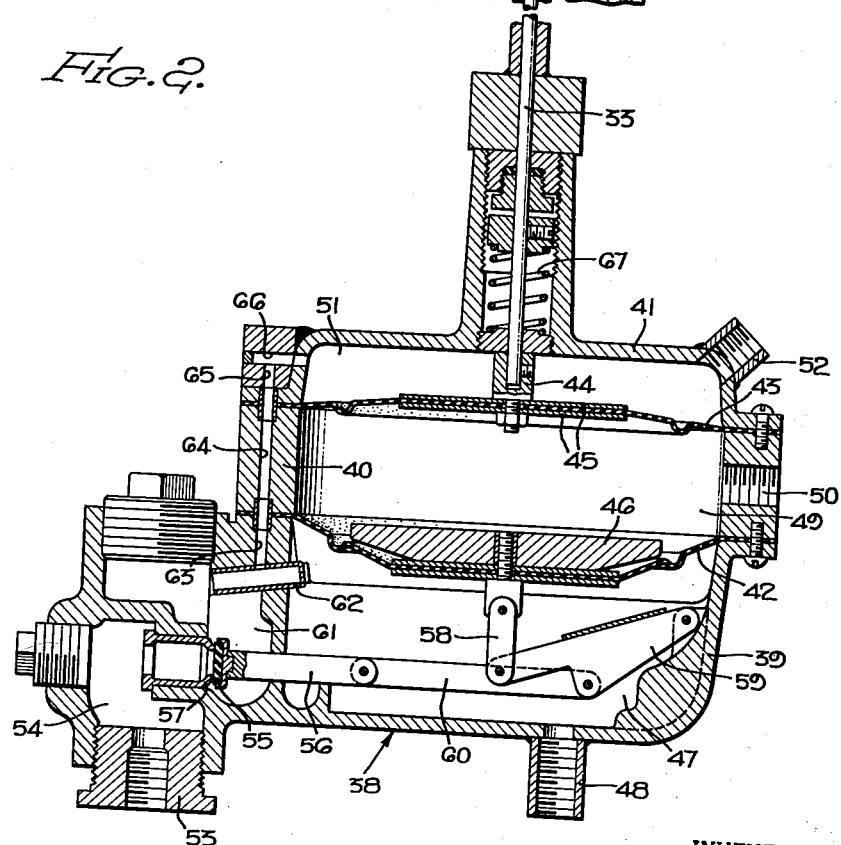
INVENTOR,
DON C. HILL
BY
*Lyon & Lyon*
ATTORNEYS Patented June 8, 1954

2,680,451

UNITED STATES PATENT OFFICE 2,680,451

HIGH-PRESSURE CUTOFF VALVE FOR DUST POT ASSEMBLY

Don C. Hill, Los Angeles, Calif.

Application March 30, 1953, Serial No. 345,338

6 Claims. (Cl. 137—363)

This invention relates to safety devices and is particularly directed to improvements in a shutoff valve for a gas distribution system.

Low pressure gas distribution systems are commonly employed by public utilities to distribute either natural or manufactured gas to customers in metropolitan areas. The mains, valves, regulators and related equipment in such low pressure distribution systems are not designed to accommodate high pressure gas. At least one accident leading to a major disaster has occurred where high pressure gas in some manner reached the low pressure distributing system. A failure of some portion of the low pressure system resulted in escape of inflammable gas. An explosion took place, causing heavy property damage and some loss of life.

It has been proposed to incorporate into low pressure gas distributing systems safety devices which function to shut off flow through the system whenever the gas pressure exceeds a predetermined limit. However, the installation of such safety devices in metropolitan districts is difficult and very expensive to accomplish. The gas mains, valves, etc., commonly are located below busy streets and it is impractical to excavate additional chambers below the streets at a large number of locations for the purpose of installing safety shutoff valves. Moreover, the necessary size of such safety devices makes it impossible to locate them within the existing vaults or chambers which are customarily located at intervals along the gas mains. Such vaults commonly contain a large filter unit, known in the art as a "dust pot." The size of such vaults containing dust pots is not large enough to permit the installation of a separate shutoff valve device.

In accordance with my invention, I place a shutoff valve mechanism within a portion of the dust pot assembly and provide novel means for actuating the valve from a location within the vault but outside the dust pot assembly. I prefer to separate the flanges normally employed at the dust pot outlet connection and to place an intermediate flange between them. This intermediate flange need not take up more than one inch of space. I provide a radially movable rod, which extends through such intermediate flange, and this rod normally acts to hold open a spring-loaded shutoff valve mounted within the dust pot assembly. A pressure-sensitive actuating device is mounted within the vault adjacent the dust pot and connected to move the said rod whenever abnormal pressure conditions exist. The device may be installed without enlarging the vault and, therefore, tremendous savings can be effected in equipping a low pressure gas distribution system with safety shutoff valves in a metropolitan area.

Accordingly, it is the principal object of my invention to provide a shutoff valve device in a dust pot assembly, which device is tripped by an external trigger rod located at the dust pot outlet connection.

Another object is to provide such a device in which the rod extends through a relatively thin insert flange interposed between existing flanges normally used to connect the dust pot assembly to the downstream piping or main.

Another object is to provide such a device in which the valve closes in the direction of the applied pressure upon radial movement of the trigger rod.

Another object is to provide such a device which is effective to close the valve whenever the gas pressure exceeds a predetermined maximum or falls blow a predetermined minimum.

Another related object is to provide such a device which does not cause objectionable restriction in flow of gas therethrough.

Other related and more detailed objects and advantages will appear hereinafter.

In the drawings:

Figure 2 is a sectional side elevation, partly broken away, showing on an enlarged scale details of the operating parts of the shutoff valve device.

Figure 1:
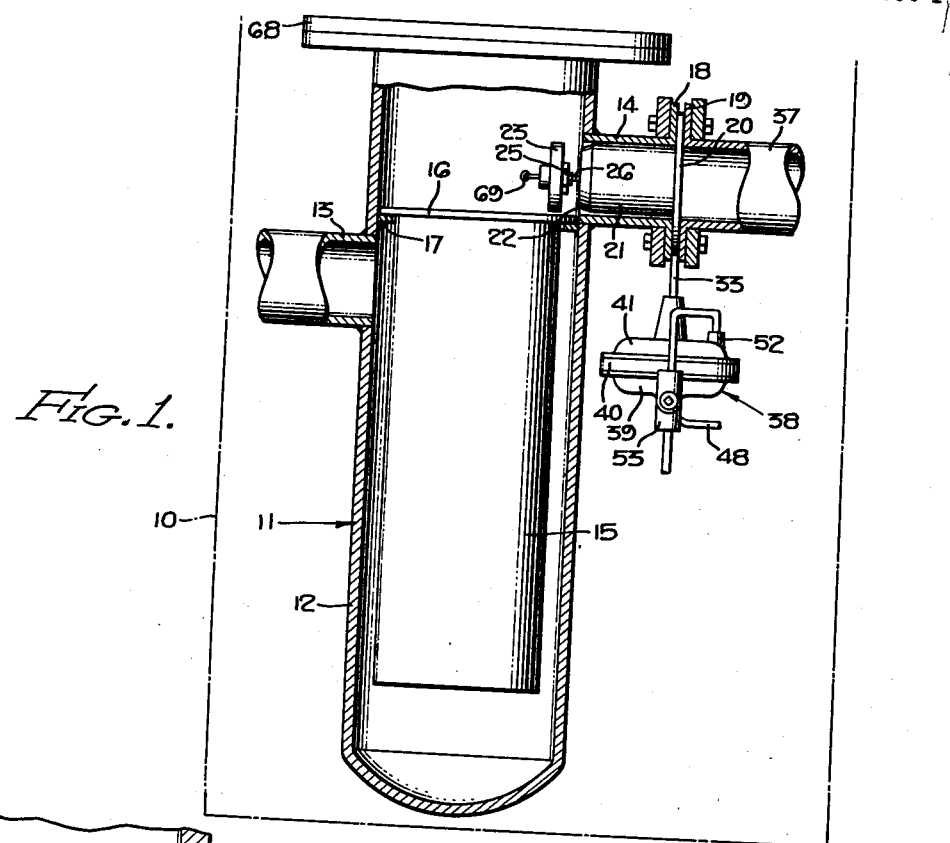
Figure 1 is a sectional side elevation, in diagrammatic form, showing a subsurface vault having a dust pot assembly located therein and showing the locations of the parts of my improved shutoff valve assembly.

Referring to the drawings, the vault, generally designated 10 and shown by the dashed lines in Figure 1, is positioned in a subsurface location and serves to provide an enclosure for the dust pot assembly 11. This assembly 11 includes an outer shell or housing 12 having an inlet pipe 13 and an outlet pipe 14 welded thereto. A filter unit 15 is positioned within the shell and is provided with a lip 16 which rests on an annular supporting shoulder 17 within the shell 12. The inlet pipe 13 is connected to the shell at a location below the shoulder 17 and the outlet pipe 14 is connected to the shell at a location above the shoulder 17. In this manner gas entering the shell 12 from the inlet pipe 13 must pass through the filter unit 15 in order to reach the outlet pipe 14.

In accordance with my invention, I separate the flanges 18 and 19 for a sufficient distance to interpose a relatively thin intermediate flange 20. As shown in Figure 2, this flange 20 is connected to one end of a sleeve 21 which extends axially within the outlet pipe 13. The forward end of this sleeve is shaped to form a valve seat 22. A valve head 23 is provided with a resilient disc 24 adapted to close against the seat 22 to form a seal. This disc 24 is held in place by means of a nut 25. The valve head 23 is fixed to a stem 26 which extends axially through a pair of slide bearings 27 and 28. Bearing 27 is carried on a ported spider 29 and the bearing 28 is carried on the boss 30 mounted on the support 31. A radial opening 32 is drilled through the support 31, shell 21 and flange 20, and a trigger rod 33 slides within this opening.

A collar 34 is fixed to the stem 26 by means of set screw 35. A compression spring 36 is interposed between the ported spider 29 and the collar 34 and thereby exerts a force tending to move the stem 26 in a direction to close the valve. The end of the trigger rod 33 is engaged by the end of the stem 26 to maintain the valve in open position. When the valve is open, as shown in Figure 2, low pressure gas may flow from the interior of the dust pot through the sleeve 21 and into the main 37 downstream from the flange 19. The openings through the ported spider 29 are sufficiently large so that very little resistance is offered to the flow of gas into the main 37 from the dust pot assembly.

The trigger rod 33 extends exteriorly of the dust pot assembly and is connected to the pressure-sensitive actuator generally designated 38. The function of this actuator 38 is to move the rod 33 downward whenever abnormal pressure conditions exist in the gas distribution system and thereby permit the spring 36 to close the valve by bringing the resilient disc 24 into sealing engagement with the valve seat 22. As described below, the actuator 38 trips the rod 33 whenever the pressure in the main upstream from the dust pot assembly exceeds a predetermined limit. The actuator 38 may also be constructed so that it serves to trip the rod 33 when the main pressure falls below a predetermined minimum. The latter function is desirable in order to effect a shutoff in the event a serious leak should occur in the piping downstream from the dust pot assembly.

As shown in Figure 2, the pressure-sensitive actuator 38 includes a base 39, a spacer 40 and a cover 41. A first diaphragm 42 is positioned between the base 39 and the spacer 40 and a second diaphragm 43 is positioned between the spacer 40 and the cover 41. The trigger rod 33 is connected to the upper diaphragm 43 by means of the fitting 44 and diaphragm plates 45.

The lower diaphragm 42 is provided with a weight 46 which is chosen to correspond to the desired operating pressure within the mains. The space 47 within the body 39 and below the diaphragm 42 is subjected to pressure in the main downstream from the dust pot assembly via fitting 48. The space 49 between the diaphragms and within the spacer 40 is vented to atmosphere through port 50. The space 51, within the cover 41 and above the diaphragm 43, is connected through fitting 52 to the main downstream from the dust pot assembly.

A source of gas under relatively high pressure is connected by means of fitting 53 to the space 54 within the body 39. A valve disc 55 carried on the stem 56 is adapted to close against the stationary valve seat 57. Whenever the pressure within the space 47 falls below a predetermined magnitude, the weight 46 acting on the lower diaphragm 42 causes the link 58 to swing the toggle 59 in a direction to move the link 60 and stem 56. The valve disc 55 is moved away from the seat 57, thereby permitting relatively high pressure gas to pass from the space 54 into the space 61. This high pressure gas then passes through fitting 62 and aligned openings 63, 64 and 65, provided in the body 39, spacer 40 and cover 41, respectively. This high pressure gas then enters the space 51 through lateral port 66. The increased pressure above the diaphragm 43 moves the trigger rod 33 downward against the action of the spring 67. Downward movement of the rod 33 moves its upper end out of the path of movement of the valve stem 26, thereby permitting the spring 36 to close the shutoff valve. In order to reset the valve in open position, it is necessary to remove the upper flange 68 of the dust pot assembly. Access may thus be gained to the fitting 69 attached to the valve head 23 and the valve head and stem may then be moved back against the action of the spring 36 and permit the rod 33 to move upward into latching position.

The detailed construction of the internal parts of the pressure-sensitive actuator 38 do not form any part of my present invention.

Figure 3:
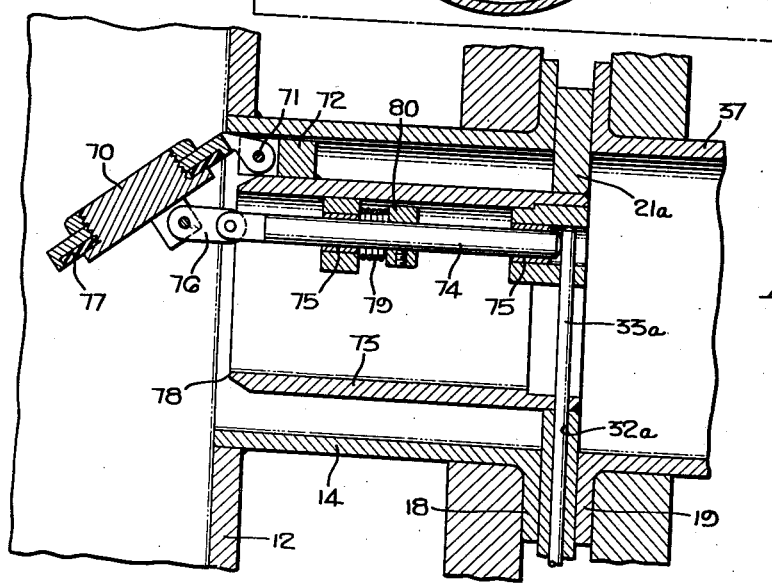
Figure 3 is a sectional side elevation showing a modified form of shutoff valve device.

In the modified form of the device shown in Figure 3, a hinged type of flapper valve 70 is employed instead of the axially moving valve previously described. This flapper valve 70 is connected by a pivot pin 71 to a bracket 72 mounted exteriorly of the sleeve 73. A stem 74, slidably mounted in spaced bearings 75, is connected to the flapper valve 70 by means of the link 76. A resilient disc 77 fixed on the valve 70 is adapted to close against the valve seat 78 formed on one end of the sleeve 73. A coil spring 79 acts against the collar 80 fixed on the stem 74 to move the stem in a direction to close the valve. The trigger rod 33a extends through a radial opening 32a in the flange 21a. The trigger rod 33a may be actuated in the same manner previously described. When it is moved downward, the spring 79 acts to close the flapper valve against the seat 78. The device may be reset in the manner described above.

Having fully described my invention, it is to be understood that I do not wish to be limited to the details herein set forth but my invention is of the full scope of the appended claims.

I claim:

1. In a safety shutoff device for a low pressure gas distributnig system, said system having a dust pot assembly provided with flanged flow conducting pipe and located within a subsurface vault, the combination of: a valve device having relatively movable cooperating valve elements, said device being positioned within said dust pot assembly, resilient means within the dust pot assembly acting to effect relative movement of the valve elements to close the valve device, a disc member positioned adjacent the flange of said pipe and having an opening, a trigger rod mounted to move in said opening and having a portion engaging one of said valve elements to prevent movement thereof, and a pressure-sensitive actuator within the vault operatively connected to move said trigger rod.

2. In a safety shutoff device for a low pressure gas distributing system, said system having a dust pot assembly provided with flanged outlet pipe and located within a subsurface vault, the combination of: a valve device having relatively movable cooperating valve parts, said device being positioned within said dust pot assembly, resilient means within the dust pot assembly acting to effect relative movement of the valve parts to close the valve device, a disc positioned adjacent the flange of said outlet pipe and having a radial opening, a trigger rod mounted to move in said opening and having a portion movable into the path of travel of one of said valve parts, and a pressure-sensitive actuator within the vault operatively connected to move said trigger rod.

3. For use in a gas distributing system, a dust pot assembly provided with an outlet pipe having a flange, a gas conduit having a flange, a disc member interposed between said flanges and having an opening, a valve device having relatively movable cooperating valve parts, said device being positioned within said dust pot assembly, resilient means acting to effect relative movement of the parts to close the valve device, a trigger rod mounted to move in said opening and having a portion movable into the path of travel of one of said valve parts, and a pressure-sensitive actuator operatively connected to move said trigger rod.

4. For use in a gas distributing system, a dust pot assembly provided with an outlet pipe having a flange, a gas conduit having a flange, a disc member interposed between said flanges and having an opening, a valve device having relatively movable cooperating valve parts, one of said valve parts comprising a stationary sleeve positioned within the outlet pipe and provided with a valve seat, the disc member being fixed to the sleeve, another of said valve parts comprising a head movable from an open position into engagement with said seat, resilient means within the dust pot assembly acting to effect relative movement of the valve parts to close the valve device, a trigger rod mounted to move in said opening and having a portion engaging one of said valve parts to prevent movement thereof, and a pressure-sensitive actuator outside the dust pot assembly operatively connected to move said trigger rod.

5. For use in a gas distributing system, a dust pot assembly provided with an outlet pipe having a flange, a gas conduit having a flange, a disc member interposed between said flanges and having an opening, a valve device having relatively movable cooperating valve parts, one of said valve parts comprising a stationary sleeve positioned within the outlet pipe and provided with a valve seat, the disc member being fixed to the sleeve, another of said valve parts comprising a head fixed upon an axially movable stem and movable into engagement with said seat, resilient means encircling the stem acting to close the valve head against said seat, a trigger rod mounted to move in said opening and having a portion movable into the path of travel of said valve stem, and a pressure-sensitive actuator operatively connected to move said trigger rod.

6. For use in a gas distributing system, a dust pot assembly provided with an outlet pipe having a flange, a gas conduit having a flange, a disc member interposed between said flanges and having a transverse opening, a valve device having relatively movable cooperating valve parts, one of said valve parts comprising a stationary sleeve positioned within the outlet pipe and fixed to said disc member, the sleeve being provided with a valve seat, another of said valve parts comprising a head pivotally mounted upon said sleeve and movable into sealing relationship with said valve seat, resilient means acting to effect relative movement of the valve parts to close the valve head against said seat, a trigger rod mounted to move in said opening and having a portion movable into the path of travel of one of said valve parts, and a pressure-sensitive actuator outside the dust pot assembly operatively connected to move said trigger rod.

No references cited.